July 3, 1956  F. J. KEOUGH  2,752,878
GAUGE FOR CALIBRATING ROTARY MOVEMENT
Filed April 19, 1955
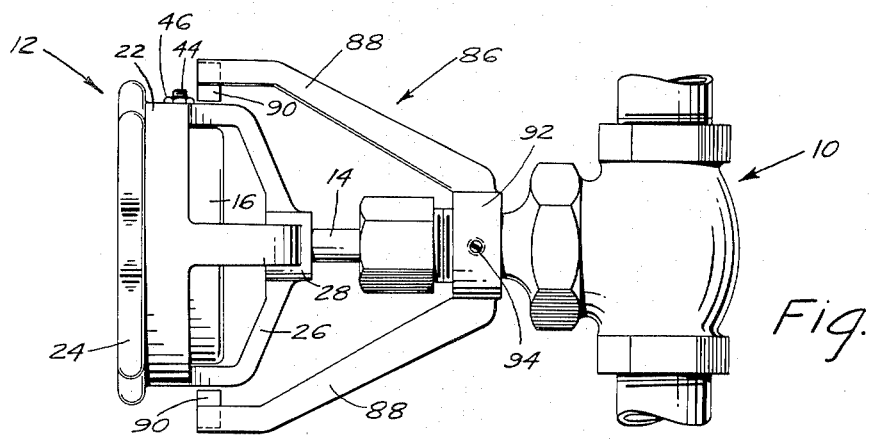
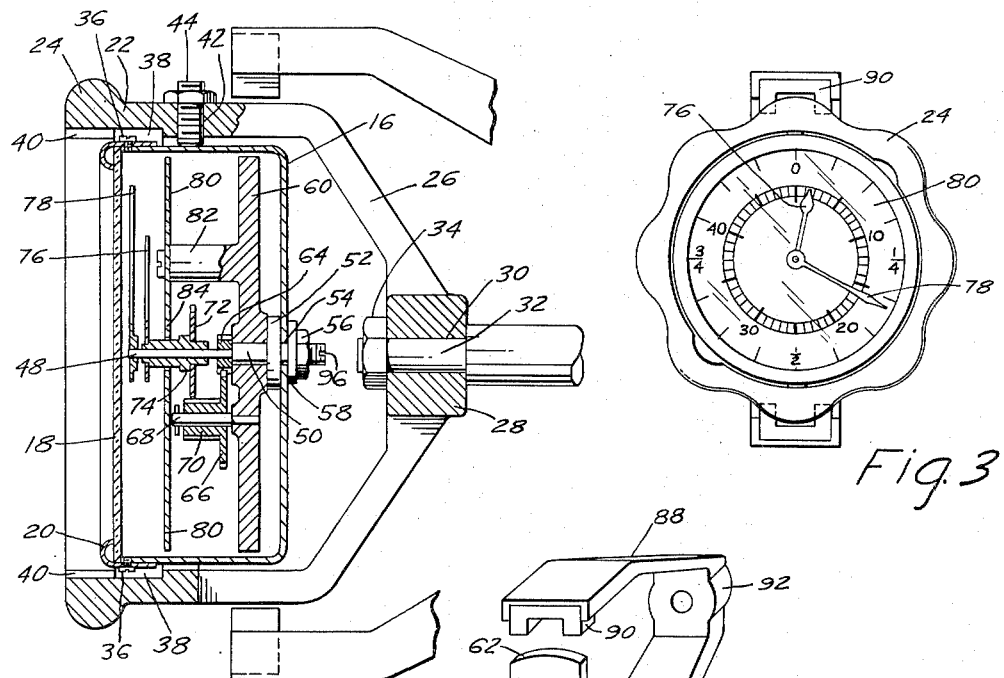
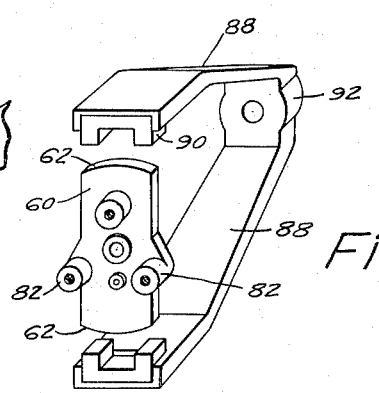
INVENTOR.
Frank J. Keough
BY Nathaniel Frucht
Atty

# United States Patent Office 2,752,878
Patented July 3, 1956

2,752,878

GAUGE FOR CALIBRATING ROTARY MOVEMENT

Frank J. Keough, Pawtucket, R. I., assignor to Tejax Engineering Corporation, a corporation of Rhode Island Application April 19, 1955, Serial No. 502,467

9 Claims. (Cl. 116—125)

The present invention relates generally to gauges and more specifically, to gauges for calibrating rotary movement.

A primary object of this invention is the provision of a gauge which may be removably attached within the operating wheel of a rotatable element, and which will be operative whether horizontally or vertically disposed.

Another object is the provision of a gauge of this character which may be adjustably positioned within said wheel to regulate the gauge setting.

A further object is the provision of novel and improved means for retaining the gauge indicating device in fixed position relative to the movement of the indicating pointers.

Another object is the provision of a gauge, the indicating pointers of which may be moved to adjust the same from outside of the gauge casing.

Still another object of the invention is the provision of a gauge which may be removably and adjustably secured within the operating wheel of a rotatable element in such a manner that the gauge will be protected by said wheel.

A further object is the provision of a gauge comprising a casing which may be secured within a retaining member of simple construction, and attached by said member to a rotatable element.

Another object is the provision of a gauge of the character described which is attractive and yet compact, durable of construction, and efficient in operation.

Other objects, features and advantages of the invention will become apparent as the description thereof proceeds when considered in connection with the accompanying illustrative drawings.

In the drawings which illustrate the best mode presently contemplated by me for carrying out my invention:

Fig. 1 is a side elevation of the gauge and assembly, showing the same connected to the valve stem of a gate valve;

Fig. 2 is a vertical sectional view, on an enlarged scale, taken along line 2—2 of Fig. 1;

Fig. 3 is a front elevation of the gauge; and

Fig. 4 is an exploded perspective, on a slightly reduced scale, showing the details of the magnet assembly.

Referring to the drawings, and more particularly to Fig. 1 thereof, the invention is shown applied to a gate valve for fluid control. The gate valve is generally indicated at 10 and the gauge and assembly is generally designated 12.

The valve 10 is of conventional construction, the details thereof forming no part of the instant invention. It will be understood, however, that the valve has the usual valve member, not shown, adapted to be moved from closed to open position and vice versa, or to be positioned at any intermediate point between closed and open position to control the flow of fluid through the line. The movable valve member is operated by a rotatable element, herein shown as being valve stem 14, said stem being rotated in the usual manner to move the valve member.

Referring to Fig. 2, the gauge assembly 12 is shown as comprising a cylindrical casing 16 which may have its front face covered by a circular glass 18 retained in place by an annular cover ring 20. All of the working parts of the gauge are housed within the casing 16, and the latter is removably and adjustably secured within an annular supporting housing 22, which housing is secured to the rotatable element 14 in a manner later to be described.

The housing 22 is provided with an integral hand wheel 24 formed for easy grasping and which may be used to turn the rotatable element and move the movable valve member from open to closed position, or vice versa. The housing 22 is further provided with a plurality of rearwardly extending converging arms 26, which arms join at their inner ends to form a collar 28, said collar having an aperture 30 therein which embraces a reduced extension 32 of the rotatable element 14. The reduced extension 32 of the rotatable element is shown as the conventional reduced portion of a valve stem fashioned to receive an ordinary hand wheel. To secure the valve assembly to the rotatable element, a nut 34 is threaded onto the extension of the reduced portion 32, said nut being adapted to be tightened against collar 28 after the gauge assembly has been preliminarily adjusted in position on the rotatable element.

The glass retaining ring 20 of the gauge casing is shown secured to said casing by means of a pair of diametrically opposed retaining screws 36. The heads of these screws project outwardly from the cylindrical surface of the casing a substantial distance, and in order that the casing 16 may be rotated within the supporting housing 22 to adjust the gauge pointers, said housing is provided with a continuous interior annular channel 38 to receive the heads of the screws. In order to permit the screws 36 to enter the channel 38, the inside of the supporting sleeve at the front thereof is provided with a pair of diametrically opposed grooves 40 which extend from the front of the sleeve inwardly to the channel 38.

In positioning the gauge casing within the supporting sleeve, it is merely necessary to align the screws 36 with the grooves 40, after which the casing may be forced inwardly until the screws 36 are within the channel 38. Similarly, the gauge may be removed from the supporting housing by aligning the screws 36 with the inner ends of the grooves 40, after which the casing may be easily moved outwardly.

The inherent advantages of the removability of the gauge casing as a unit will be apparent. Thus, if it is desired to substitute a differently calibrated gauge for the one in use, or to substitute a gauge in order to repair one which has been in use, it is merely necessary to remove the gauge from within the housing and wheel, rather than undertaking the more laborious task of removing the entire assembly from the rotatable element.

The supporting housing 22 is apertured at 42 to receive a retaining bolt 44, and a retaining nut 46 threaded to the outer end of bolt 44. The bolt 44 is threaded through the aperture 42 and its inner end abuts against the outer cylindrical surface of the gauge casing to retain the latter firmly in position within the supporting housing. While only one retaining bolt 44 is disclosed, it will be obvious that any number of such bolts may be provided as is deemed practical.

It will be evident that although retaining bolt 44 will maintain the gauge casing in position when said bolt is tightened, when the bolt is loosened, the gauge casing may be rotated within the supporting housing by simply grasping the casing and turning the same. The importance of this adjustment will later become apparent.

The construction of the interior working parts of the gauge will now be described. A shaft 48 is mounted internally of casing 16 and is fixedly secured thereto for rotation when the gauge is in use. As will be seen most clearly in Fig. 2, shaft 48 has an enlarged rear portion 50 and an integral collar 52 which abuts the inner rear surface of the casing. The rearmost portion of shaft 48 extends through an aperture 54 centrally disposed in the casing rear wall and is threadedly engaged by nut 56 and washer 58. It will be apparent from this construction that when the nut 56 is tightened, the gauge casing will be held between the collar 52 and the washer 58, and thus shaft 48 will be rigid with the gauge casing. When the device is in this condition, rotation of the supporting sleeve 22 to revolve the rotatable element 14 will be imparted to the gauge casing, and thus to shaft 48 to operate the gauge in a manner now to be described.

Mounted on the enlarged portion 50 of shaft 48 for free rotation is a generally elongated magnetic plate 60. As will be seen in Fig. 4, the ends 62 of plate 60 are arcuately formed to conform to the interior of casing 16, whereby said ends are always maintained in closely spaced relation thereto. A driving pinion 64 is keyed to shaft 48 adjacent to and in front of plate 60, this drive pinion meshing with a relatively large driven gear 66 which is rotatable on a pin 68 projecting from the front of plate 60. Integral with driven gear 66 and on the front face thereof is a relatively small drive gear 70. Drive gear 70 meshes with and serves to rotate a relatively large driven pinion 72, which pinion is carried by a sleeve 74 which extends toward the forward end of the shaft 48 and is freely rotatable thereon. A small indicating pointer 76 is rigidly secured to the forward end of sleeve 74. Similarly, a large pointer 78 is rigidly secured to the forward end of shaft 48.

An indicating device, comprising a dial face 80 is secured to magnetic plate 60 by means of a plurality of posts 82, said dial face being centrally apertured as at 84 to permit sleeve 74 to pass therethrough. When the dial face 80 is in its vertical position as per Fig. 3, the elongated magnetic plate 60 is in its north-south position, as per Fig. 4. Fixedly secured to the valve coupling, note Fig. 1, is a bifurcated bracket generally designated at 86. The bracket 86 comprises a pair of spaced diverging arms 88 each of which carries at its free extremity a magnet 90. The convergent ends of arms 88 are joined by a collar 92 which may be threaded onto the valve coupling. A retaining screw 94 is provided to maintain the bracket 86 and hence magnets 90 is their proper positions.

As will be clearly seen from Figs. 1 and 2, magnets 90 are maintained in closely spaced relation with respect to the housing 22 and also are disposed adjacent the ends 62 of magnetic plate 60. Thus, due to the magnetic attraction between magnets 90 and plate 60, the latter will remain in fixed position when rotation is impacted to hand wheel 24 and housing 22, and hence to casing 16 and shaft 48. Since dial face 80 is secured to plate 60, it, too, will remain in fixed position. It will be understood that in order not to hamper the magnetic lines of force between magnets 90 and plate 60 any more than necessary, housing 22 and gauge casing 16 are preferably composed of suitable non-magnetic material, such as brass. Meanwhile, the rotation of shaft 48 results in the simultaneous movement of the indicating pointers 76 and 78, it being understood that the aforedescribed gearing is such that one complete revolution of shaft 48, and hence large pointer 78, causes small pointer 76 to move one calibration on the dial.

The means whereby the dial face 80 is maintained in fixed position by magnetic force constitutes an important feature of the instant invention. In order to achieve effective and successful operation for a gauge of the character described, it is essential that the dial face remain constant during movement of the pointers. Due to the desired construction wherein the gauge is mounted within the hand wheel and rotates therewith, it is virtually impossible to secure the dial face by mechanical retaining means, and any such mechanical means that might solve the problem would be highly impractical from a commercial standpoint. Devices of this type heretofore in use have tried weighting the plate to which the dial is attached, thus maintaining it in a fixed position by gravitational pull. This, however, is only operative where the gauge is vertically disposed, whereas the magnetic means of the instant invention are effective no matter what plane the gauge is in.

If it is desired to effect an adjustment of the indicating pointers without disturbing the position of the gauge casing within the supporting housing, nut 56 may be loosened on the rearwardly protruding end of the shaft 48, after which said shaft may be rotated independently of any movement of the rotatable element and gauge casing to adjust the position of the pointers with respect to the casing and the dial face 80.

This adjustment is useful for various purposes, such as to correct any errors in the gauge resulting from long use, or to set the indicating pointers upon zero for a new position of a movable member, such as a valve member. In order to facilitate the adjustment of the indicating pointers by rotation of shaft 48, the rearwardly protruding end of said shaft may have a slot 96 for the reception of an offset screw driver or the like.

Adjustment of the indicating pointers 76 and 78 may also be accomplished by loosening the retaining bolt 44 and manually rotating the gauge casing within the supporting housing 22. It will be evident that because plate 60 will be held in a relatively fixed position by magnetic force, rotation of the gauge casing will effect a movement of the pointer 78 through the shaft 48, and a movement of the pointer 76 through the shaft 48 and the gear train to accomplish the adjustment, the dial face being maintained in relatively fixed position as aforestated.

Thus it will be seen that there is provided in accordance with this invention a gauge which will effectively calibrate the movement of a rotatable element such as the valve stem of a gate valve. Furthermore, there is provided a gauge in which the position of the indicating pointers with respect to their dial may be adjusted by rotation of the shaft 48 independent of the gauge casing, or by rotation of the gauge casing itself.

While there is shown and described herein certain specific structure embodying the invention it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. In combination, a rotatable element, a rotatable supporting member attached to said element for imparting rotation thereto, a gauge fixedly carried by said supporting member for rotation therewith, said gauge comprising a casing and an internal shaft secured thereto whereby rotation of the supporting member causes the casing and shaft to rotate therewith, an indicating device freely mounted on said shaft, magnetic means for maintaining said indicating device in fixed position when the gauge is rotated, and indicating members associated with said shaft and cooperating with said indicating device for calibrating rotations of said device.

2. In combination, a rotatable element, a rotatable supporting member attached to said element for imparting rotation thereto, a gauge fixedly carried by said supporting member for rotation therewith, said gauge comprising a casing and an internal shaft secured thereto whereby rotation of the supporting member causes the casing and shaft to rotate therewith, an indicating device freely mounted on said shaft, magnetic means connected to said indicating device, cooperating magnetic means fixedly mounted externally of said casing whereby said indicating device is maintained in fixed position when the gauge is rotated, and indicating members associated with said shaft and cooperating with said indicating device for calibrating rotations of said element.

3. The combination as set forth in claim 2 further characterized in that said first mentioned magnetic means comprises an elongated magnetic plate freely mounted on said shaft and said cooperating magnetic means comprises a bifurcated bracket supporting a pair of permanent magnets outside the casing adjacent the ends of said elongated plate.

4. In a device of the character described, a rotatable element, a gauge comprising as a complete unit a casing attached to said element and adapted to rotate therewith, an indicating device in said casing, magnetic means for maintaining said device in fixed position with respect to the vertical during rotation of said rotatable element, a cooperating indicating member carried by said casing for indicating the rotations of said element, and means connecting said indicating member to said casing whereby said last named member may be moved with respect to said casing to adjust the position of the same without dismantling said gauge or removing the same from said element.

5. In a gauge for indicating the rotations of an element, a casing secured to said element to rotate therewith, an indicating device in said casing, magnetic means for retaining said device in fixed position, a cooperating indicating member carried by said casing for indicating the rotations of said element, and means for connecting said indicating member with said casing for cooperation with said device, said connecting means being constructed and arranged for disengagement from said casing to adjust said indicating member with respect to said device without dismantling said gauge or removing the same from said element.

6. In combination, a rotatable element, a supporting member attached to said element, said supporting member being adapted to receive power to rotate the same and to thereby rotate said element, a gauge comprising as a complete unit a casing, an indicating device in said casing, magnetic means for retaining said device in fixed position, and an indicating member in said casing for cooperation with said device and means for mounting said casing on said supporting member for rotation therewith to actuate said indicating member, said mounting means and said gauge being constructed and arranged for adjustment of said casing with respect to said supporting member to adjust said indicating member with respect to said device and for removal of said gauge as a unit from said supporting member without dismantling said gauge.

7. In combination, a rotatable element, a supporting sleeve attached to said element, said supporting sleeve being adapted to receive power to rotate said element, a gauge comprising as a complete unit a casing, an indicating device in said casing, magnetic means for retaining said device in fixed position, and an indicating member in said casing for cooperation with said device, and means for mounting said casing in said sleeve for rotation therewith to actuate said indicating member, said mounting means and said gauge being constructed and arranged for adjustment of said casing in said sleeve to adjust said indicating member with respect to said device, and for removal of said gauge as a unit from said sleeve without dismantling said gauge.

8. In combination, a rotatable element, a supporting sleeve attached to said element, said supporting sleeve being adapted to receive power to rotate said element, a gauge comprising as a complete unit a casing, an indicating device in said casing, magnetic means for retaining said device in fixed position, and an indicating member in said casing for cooperation with said device, means for mounting said casing in said sleeve for rotation therewith to actuate said indicating member, said mounting means and said gauge being constructed and arranged for adjustment of said casing in said sleeve to adjust said indicating member with respect to said device, and for removal of said gauge as a unit from said sleeve without dismantling said gauge, and means for locking said casing in adjusted position in said sleeve.

9. In combination, a rotatable element, a supporting member attached to said element, said supporting member being adapted to receive power to rotate the same and to thereby rotate said element, a gauge comprising as a complete unit a casing, an indicating device in said casing, means for retaining said device in fixed position, a stub shaft carried by said casing within the same, an indicating member for cooperation with said device mounted for rotation with said stub shaft, and means for disengaging said stub shaft from said casing for adjustment of said indicating member with respect to said device without dismantling said gauge, and means for mounting said casing on said supporting member for rotation therewith to actuate said indicating member, said mounting means and said gauge being constructed and arranged for removal of said gauge as a unit from said supporting member without dismantling said gauge.

References Cited in the file of this patent

UNITED STATES PATENTS

| | | |
|---|---|---|
| 2,104,520 | Jackson | Jan. 4, 1938 |
| 2,104,521 | Jackson | Jan. 4, 1938 |